(12) United States Patent
Bedell et al.

(10) Patent No.: US 7,970,782 B1
(45) Date of Patent: Jun. 28, 2011

(54) SYSTEMS AND METHODS FOR SET FILTERING OF DATA

(75) Inventors: Jeffrey A. Bedell, Arlington, VA (US); William Hurwood, Washington, DC (US); Benjamin Z. Li, Great Falls, VA (US); Fabrice Martin, Washington, DC (US); Sadanand Sahasrabudhe, McLean, VA (US); Jun Yuan, Sterling, VA (US)

(73) Assignee: Microstrategy Incorporated, McLean, VA (US)

( * ) Notice: Subject to any disclaimer, the term of this patent is extended or adjusted under 35 U.S.C. 154(b) by 1207 days.

(21) Appl. No.: 10/134,677

(22) Filed: Apr. 30, 2002

Related U.S. Application Data

(63) Continuation-in-part of application No. 10/043,262, filed on Jan. 14, 2002, now abandoned, which is a continuation of application No. 09/884,474, filed on Jun. 20, 2001, now abandoned.

(51) Int. Cl.
*G06F 7/00* (2006.01)
*G06F 17/30* (2006.01)
(52) U.S. Cl. ........................ 707/760; 707/764
(58) Field of Classification Search .................... 707/10, 707/100, 6, 2–4, 102
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,787,411 A * | 7/1998 | Groff et al. | 707/2 |
| 5,864,856 A | 1/1999 | Young | |
| 5,870,746 A | 2/1999 | Knutson | |
| 5,914,878 A | 6/1999 | Yamamoto | |
| 5,918,225 A | 6/1999 | White | |
| 5,918,232 A | 6/1999 | Pouschine | |
| 6,009,459 A * | 12/1999 | Belfiore et al. | 709/203 |
| 6,058,391 A * | 5/2000 | Gardner | 707/4 |
| 6,094,651 A | 7/2000 | Agrawal | |
| 6,154,766 A | 11/2000 | Yost | |
| 6,247,008 B1 | 6/2001 | Cambot | |
| 6,278,994 B1 * | 8/2001 | Fuh et al. | 707/4 |
| 6,279,033 B1 | 8/2001 | Selvarajan | |
| 6,282,537 B1 * | 8/2001 | Madnick et al. | 707/4 |
| 6,539,371 B1 * | 3/2003 | Bleizeffer et al. | 707/2 |

OTHER PUBLICATIONS

Gupta, Himanshu et al., "Index Selection for OLAP," IEEE 1063-6382, pp. 208-219, Sep. 26, 2002.
Ho, Ching-Tien et al., "Partial-Sum Queries in OLAP Data Cubes Using Covering Codes," ACM 0-89791-910-6, pp. 228-237, Sep. 26, 2002.

(Continued)

*Primary Examiner* — Cam Y T Truong
(74) *Attorney, Agent, or Firm* — Hunton & Williams, LLP

(57) ABSTRACT

Systems and methods are provided for filtering data in a database using an execution plan. The execution plan has a first processing pass against the database that calculates a filter set using a filter criteria, and a second processing pass against the filter set that calculates a report result.

24 Claims, 19 Drawing Sheets

OTHER PUBLICATIONS

Robert C. Stern, Bruce M. Anderson and Craig W. Thompson, A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1 (electronic copy on enclosed CD), copyright 2000.

Getting Started with Business Objects Version 5.1 (electronic copy on enclosed CD), copyright 2000.

Business Objects Deployment Guide (electronic copy on enclosed CD), copyright 2000.

Broadcast Agent 5.1 (electronic copy on enclosed CD), copyright 2000.

Business Objects 5.1 (electronic copy on enclosed CD), copyright 2000.

Web Intelligence 2.6 (electronic copy on enclosed CD), copyright 2000.

Business Objects Designer's Guide Version 5.1 (electronic copy on enclosed CD), copyright 2000.

Business Objects Error Message Guide Version 5.1 (electronic copy on enclosed CD), copyright 2000.

Business Objects Generic ODBC Access Guide Version 5.1 (electronic copy on enclosed CD), copyright 2000.

Business Objects Info View User's Guide (electronic copy on enclosed CD), copyright 2000.

Business Objects Installation and Upgrade Guide (electronic copy on enclosed CD), copyright 2000.

Business Objects MS Access Database Guide Version 5.1 (electronic copy on enclosed CD), copyright 2000.

Business Objects MS SQL Server Database Guide Version 5.1 (electronic copy on enclosed CD), (2000).

Business Objections Supervisor's Guide Version 5.1 (electronic copy on enclosed CD), (2000).

GIS/LIS'88 Proceedings accessing the world, vol. 2 pp. 741-750, Dec. 2, 1988.

Quick Start MicroStrategy Agent Version 6.0 (electronic copy on enclosed CD), 1999.

User Guide MicroStrategy Agent Version 6.0 (electronic copy on enclosed CD), 1999.

User Guide MicroStrategy Architect Version 6.0 (electronic copy on enclosed CD), 1999.

User Guide MicroStrategy Objects Version 6.0 (electronic copy on enclosed CD), 1999.

Excel Add-In MicroStrategy Objects Version 6.0 (electronic copy on enclosed CD), 1999.

User Guide MicroStrategy Intelligence Server Version 6.0 (electronic copy on enclosed CD), 1999.

User Guide MicroStrategy Administrator Version 6.0 (electronic copy on enclosed CD), 1999.

Administrator Guide MicroStrategy Administrator Version 6.5 (electronic copy on enclosed CD), 1999.

* cited by examiner

Metric Qualification Set Filter used in a Report (Example Report)

Set Filter Workflow

SQL Statements

1st SQL Pass

All Customer, Month combinations with a total of Dollar Sales [DLR_SLS] between $100 and $200 are stored in a table TEMP

Processing of the Metric Qualification Set Filter in the database

```
insert into TEMP
select     a13.[CUSTOMER_ID] AS CUSTOMER_ID,
           a14.[MONTH_ID] AS MONTH_ID
from       [ORDER_FACT] a11, [LU_EMPLOYEE] a12,
           [LU_ORDER] a13, [LU_DATE] a14
where      a11.[EMP_ID] = a12.[EMP_ID]
and        a11.[ORDER_ID] = a13.[ORDER_ID]
and        a11.[ORDER_DATE] = a14.[DATE_ID]
group by   a13.[CUSTOMER_ID], a14.[MONTH_ID]
having     sum(a11.[DLR_SLS]) between 100 and 200
```

FIG. 6

Metric Qualification Set Filter used in a Report (Example Report)

| Set Filter Workflow | |
|---|---|
| SQL Statements | |
| 2nd SQL Pass | Processing of the Report result by using the Metric Qualification Set Filter result in the table TEMP |

```
Select    a13.[MONTH_ID] AS MONTH_ID,
          max(a15.[MONTH_DESC]) AS MONTH_DESC,
          a11.[Item_Id] AS Item_Id,
          max(a14.[ITEM_NAME]) AS ITEM_NAME,
          sum(a11.[DLR_SLS]) as DLR_SLS
from      [ORDER_DETAIL] a11, [LU_ORDER] a12, [LU_DATE] a13,
          [TEMP] pa1, [LU_ITEM] a14, [LU_MONTH] a15
where     a11.[ORDER_ID] = a12.[ORDER_ID]
and       a11.[ORDER_DATE] = a13.[DATE_ID]
and       a12.[CUSTOMER_ID] = pa1.[CUSTOMER_ID]
and       a13.[MONTH_ID] = pa1.[MONTH_ID]
and       a11.[Item_Id] = a14.[Item_Id]
and       a13.[MONTH_ID] = a15.[MONTH_ID]
group by  a13.[MONTH_ID], a11.[Item_Id]
```

[Display part] Calculates for each Month and Item the total Dollar Sales value

[Filter part] for all Customers and Months which are contained in the table TEMP

FIG. 7

Relationship Set Filter used in a Report (Example Report)

Set Filter Workflow

SQL Statement

Processing of the Relationship Set Filter in the database

1st SQL Pass

```
insert into  TEMP
select       a11.[CALL_CTR_ID] AS CALL_CTR_ID,
             a11.[Item_Id] AS Item_Id
from         [ORDER_DETAIL] a11, [LU_DATE] a12
where        a11.[ORDER_DATE] = a12.[DATE_ID]
and          (a11.[PROMOTION_ID] in (5, 6, 9, 2, 3, 4, 1)
and          a12.[YEAR_ID] in (1998)
group by     a11.[CALL_CTR_ID],
             a11.[Item_Id]
having       sum([DLR_SLS]) > 0
```

All Calling Center, Item combinations with a Dollar Sales transaction for Promotions in the Year 1998 are stored in a table TEMP

FIG. 11

Set Filter Workflow

Relationship Set Filter used in a Report (Example Report)

SQL Statement

Processing of the Report result by using the Relationship Set Filter result in the table TEMP

2nd SQL Pass

```
select    a14.[CATEGORY_ID] AS CATEGORY_ID,
          max(a15.[CATEGORY_DESC]) AS CATEGORY_DESC,
          sum([DLR_SLS]) as DLR_SLS
from      [ORDER_DETAIL] a11, [TEMP] pa1, [LU_DATE] a12,
          [LU_ITEM] a13, [LU_SUBCATEG] a14,
          [LU_CATEGORY] a15
where     a11.[CALL_CTR_ID] = pa1.[CALL_CTR_ID]
and       a11.[Item_Id] = pa1.[Item_Id]
and       a11.[ORDER_DATE] = pa1.[DATE_ID]
and       a11.[ORDER_DATE] = a12.[DATE_ID]
and       a11.[Item_Id] = a13.[Item_Id]
and       a13.[SUBCAT_ID] = a14.[SUBCAT_ID]
and       a14.[CATEGORY_ID] = a15.[CATEGORY_ID]
and       pa1.[Item_Id] = a11.[Item_Id]
and       pa1.[CALL_CTR_ID] = a11.[CALL_CTR_ID]
group by  a14.[CATEGORY_ID]
```

[Display part]
Calculates for each Category the metric value of Dollar Sales

[Filter part]
for all Calling Centers and Items which are contained in the table TEMP

FIG. 12

Set Filter Workflow

Report Result

Set filter object = Report object

Report result:

[Display part] Shows per Category the metric value of Dollar Sales

[Filter part] for all Customers with Dollar Sales in Year 1998

Report Result Driven Set Filter used in a Report (Example Report)

Report Result Driven Set FilterReport

File  Edit  View  Data  Grid  Help  Window

Save and Close                    Red and Black

Filter Details:
Report: Report Result Driven Set Filter

| Category | Metrics | Dollar Sales |
|---|---|---|
| Electronics | | $ 177 |
| Food | | $ 732 |
| Gifts | | $ 1,100 |
| Health & Beauty | | $191 |
| Household | | $1,776 |
| Kid's Korner | | $ 169 |
| Travel | | $244 |

Execution complete | Execution Time: 00:06:14 | Rows: 7 | Columns: 1

FIG. 15

Report Result Driven Set Filter used in a Report
(Example Report)

Processing of the Report Result Driven Set Filter in the database

Set Filter Workflow

SQL Statement

1st SQL Pass

```
insert into TEMP
select     a13.[CUSTOMER_ID] AS CUSTOMER_ID,
           sum(a11.[DLR_SLS]) as DLR_SLS
from       [ORDER_FACT] a11, [LU_EMPLOYEE] a12,
           [LU_ORDER] a13, [LU_DATE] a14, [LU_CUSTOMER] a15
where      a11.[EMP_ID] = a12.[EMP_ID]
and        a11.[ORDER_ID] = a13.[ORDER_ID]
and        a11.[ORDER_DATE] = a14.[DATE_ID]
and        a13.[CUSTOMER_ID] = a15.[CUSTOMER_ID]
and        (a14.[YEAR_ID] in (1998)
group by   a13.[CUSTOMER_ID]
```

All Customers with a Dollar Sales transaction for the Year 1998 are stored in a table TEMP

FIG. 16

Set Filter Workflow

Report Result Driven Set Filter used in a Report
(Example Report)

SQL Statement

2nd SQL Pass

Processing of the Report result by using the
Report Result Driven Set Filter result in the table TEMP

```
select    a14.[CATEGORY_ID] AS CATEGORY_ID,
          max(a15.[CATEGORY_DESC]) AS CATEGORY_DESC,
          sum([DLR_SLS]) as DLR_SLS
from      [ORDER_DETAIL] a11, [LU_ORDER] a12,
          [TEMP] pa1, [LU_ITEM] a13, [LU_SUBCATEG] a14,
          [LU_CATEGORY] a15
where     a11.[ORDER_ID] = a12.[ORDER_ID]
and       a12.[CUSTOMER_ID] = pa1.[CUSTOMER_ID]
and       a11.[Item_Id] = a13.[Item_Id]
and       a13.[SUBCAT_ID] = a14.[SUBCAT_ID]
and       a14.[CATEGORY_ID] = a15.[CATEGORY_ID]
group by  a14.[CATEGORY_ID]
```

[Display part]
Calculates for each Category the metric value of Dollar Sales

[Filter part]
for all Customers which are contained in the table TEMP

FIG. 17

SYSTEMS AND METHODS FOR SET FILTERING OF DATA

RELATED APPLICATIONS

This application is a continuation-in-part of U.S. application Ser. No. 10/043,262 entitled "Systems and methods for set filtering of data," filed on Jan. 14, 2002, now abandoned, which is a continuation of U.S. application Ser. No. 09/884,474, entitled "Systems and methods for set filtering of data," filed on Jun. 20, 2001, abandoned.

FIELD OF THE INVENTION

The invention relates to reporting system data access, sorting and output generation through the use of filtering.

BACKGROUND OF THE INVENTION

With the large databases common in business today, data sorting and filtering is an important part of business management. As databases become larger and the desired filtering and grouping of the data becomes more complex, systems and methods for quickly and easily filtering and grouping data are required.

In reporting systems, such as decision support systems, business intelligence systems and on-line analytical processing systems (OLAP), data sorting and extraction are used to retrieve data in an efficient manner. Often, reports are processor intensive and therefore, many systems lack the ability to extract data quickly as part of the processing. That inability is a drawback in current systems.

Also, the number of functions that may be performed through the OLAP system engine enables quicker and more efficient reports.

SUMMARY OF THE INVENTION

The invention solves at least these problems and others in the art by providing systems and methods for filtering data that is stored in a database. Embodiments of the invention facilitate filtering and sorting the data by compounding the results of two or more filter sets. Thus, whereas prior OLAP and other reporting systems were unable to generate a set that comprises members from two groups only (e.g., A and B, but not C), the present invention provides a function to do so through its SQL coding. Further, the present invention provides this function as a set filter that may be applied to data in the database to comprise part of a report definition. As such, a report designer may simply select the set filter, select the groups that form the set and the OLAP engine processes the filter against the data. The present invention thus achieves what had heretofore not been provided in the OLAP environment through a simple and convenient graphical user interface and engine functionality as described in greater detail below.

According to one embodiment, a set filter object may be created. For background, some terminology may be helpful.

An attribute is a way of partitioning data into parts called elements. A filter set is realized as a table with rows, each row containing an element from an attribute. The attributes may also be called a level of data. A filter set is distinguished from a table in a relational database context in that a filter set has both a definition (as a filter expression) as well as data (as a table) representation.

A filter object is comprised of a logical expression of one or more qualification(s) and/or one or more operator(s), based on the data or a derived calculation of the data in a database. A set filter object may be defined by filter object criteria and output level specification that indicates the attribute grouping to be used upon instantiation (generation of the object based on input data). An instantiated set filter object is realized as a table, each of whose rows have elements or groups of elements from the attribute(s) defined as the output level. For example, an output level may be "customer" so an instantiated set filter object would apply filter criteria to a table and have output rows containing the elements from the table based on the customer attribute. In other words, the filter object criteria may provide a logical expression of two or more qualifications based on the data or a derived calculation of the data. Also, the output level specification represents the filtered data set to be produced.

According to one embodiment of the present invention, one particular type of set filter object may comprise a relationship filter. This type of set filter object comprises a filter object plus an output level and also specifies a relationship definition that is used to determine how to relate the filter object to the set's output level.

For example, a set filter object may be defined with the criteria as "Product='Shoes'" (in a filter object) with an output level of Customer. The instantiation of this set generates a table of customers from data that satisfy the filter criteria of "Product='Shoes.'" Depending on the tables used to generate this output, however, the manner in which to produce the output may be ambiguous or variable. By adding a relationship definition, the set can be fully resolved without ambiguity or variation. For example, one relationship definition may be a table containing Products and Customers. With this relationship in the relationship set filter object, the system resolves the set filter object using the table containing Products and Customers. Another example is as follows. Instead of defining the relationship to be a table containing products and customers, the relationship may be defined by using a metric, such as a sales metric that is included in a table with product information and another table with customer information. In this case, the instantiated relationship set filter object is resolved by using the sales metric to find the table(s) that relates products to sales and sales to customers. Here the sales metric is used to define how products and customers should be related.

Another example is as follows. Another relationship definition for this relationship set filter object may be to use the Returns attribute (e.g., a flag indicating when a product has been returned by a customer). Using this relationship the set is resolved by finding the relationship(s) between Customer and Returns and Returns and Product.

By providing a relationship set filter object, the instantiation process is able to resolve ambiguity between various possibilities for applying filters to data to get output. The output for a set may generate a report from an OLAP system, for example, or from some other relational database environment. The power of the relationship filter is the ability to define fully the set, including the output level, the filter, and the relationship or how to apply the filter to the output level. In another example, suppose the filter is essentially empty, meaning that all data is returned. Here, the other parameters may be Sales and Inventory and the output level is Products. Also suppose that the common relationships are "default," Sales, and Inventory. If the relationship set filter object is defined with the Sales relationship, you get a list of all the Products that have been Sold (or appear in the sales table which usually means the same thing). If the user defines the relationship set filter object with an Inventory relationship, the output would be a list of all the Products that are In Stock (or appear in the stock table). If the default relationship is applied, the output is a list of all products in the Product lookup table (which is usually some listing of all the products the company has sold or stocked in the past 12-24 months). In all cases, the relationship may be used in a way to enable resolution, thus allowing this type of object greater variation.

Further, these set objects may be combined with other set objects using various operators including AND, OR, NOT, UNION, MINUS, INTERSECT.

Other advantages of the present invention may be appreciated from review of the detailed description and figures.

BRIEF DESCRIPTION OF THE DRAWING FIGURES

The invention will be more fully understood from the following Detailed Description of Preferred Embodiments and the following figures, of which:

FIG. 6 illustrates an example of SQL statements for a first pass used to generate the report shown in FIG. 5;

FIG. 7 illustrates an example of SQL language for a second pass used to generate the report shown in FIG. 5;

FIG. 11 illustrates an example of SQL statements for a first pass used to generate a report such as that shown in FIG. 10;

FIG. 12 illustrates an example of SQL statements for a second pass used to generate a report such as that shown in FIG. 10;

FIG. 15 illustrates an example of an interface display of a report using a report result driven set filter;

FIG. 16 illustrates an example of SQL statements for a first pass used to generate a report such as that shown in FIG. 15;

FIG. 17 illustrates an example of SQL statements for a second pass used to generate a report such as that shown in FIG. 15;

DETAILED DESCRIPTION OF PREFERRED EMBODIMENTS

Figure 1:
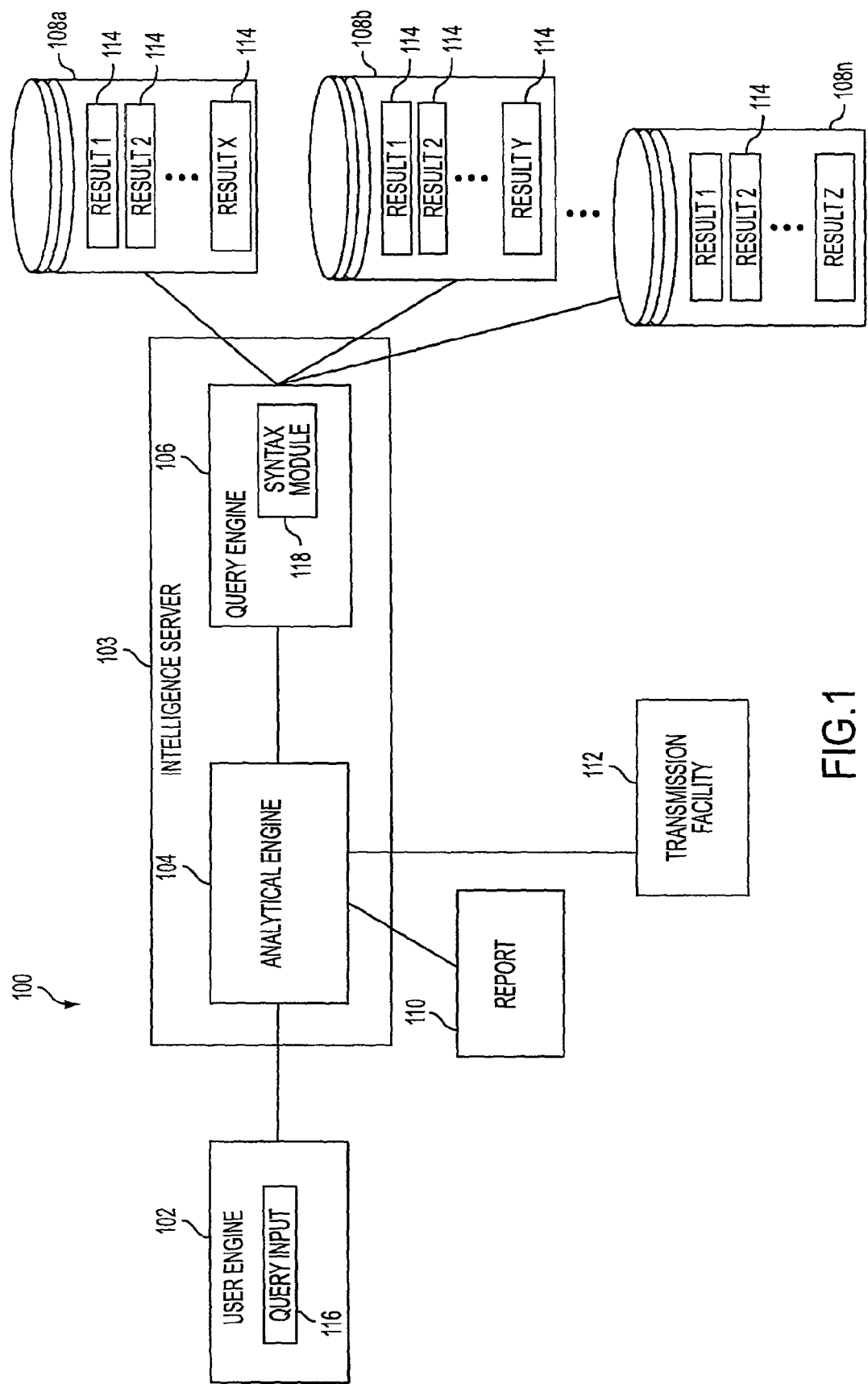
FIG. 1 is a block diagram illustrating an architecture for a system according to an embodiment of the invention.
Figure 2:
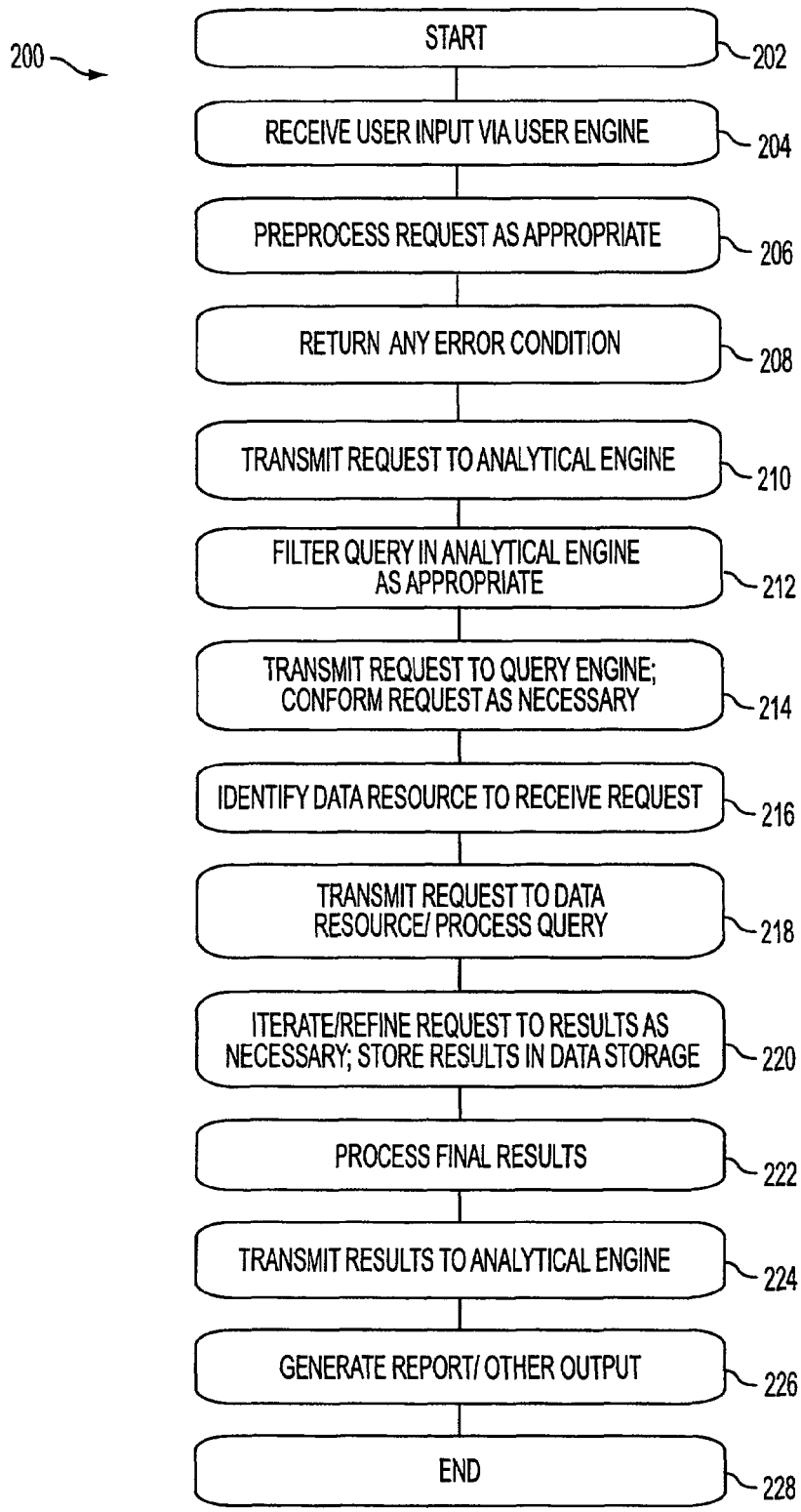
FIG. 2 is a flowchart illustrating steps performed by a process utilizing a query engine according to an embodiment of the invention.

While the present invention relates to relationship set filtering of data, FIGS. 1 and 2 relate to an embodiment of an architecture for processing data in which this invention may be used.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b ... 108n (where n is an arbitrary number). The data storage devices 108a, 108b ... 108n may include or interface to a relational database or another structured database stored on a hard disk, an optical disk, a solid state device or another similar storage media. When implemented as databases, the data storage devices 108a, 108b ... 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joins or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Examples of preferred embodiments of the invention are shown in FIGS. 3-18. In the embodiments shown in FIGS. 3-13, the output of a set filter is further filtered by qualification parameters. In the embodiments shown in FIGS. 14-18, the results of a first report are used as the basis for a second report.

Complex combinations of the simple examples discussed below can be formulated by combining multiple filter expressions of each of types discussed below. For example logical operators can be used to take the union of the results of two filter expressions and exclude from that union the results of a third filter expression.

Figure 3:
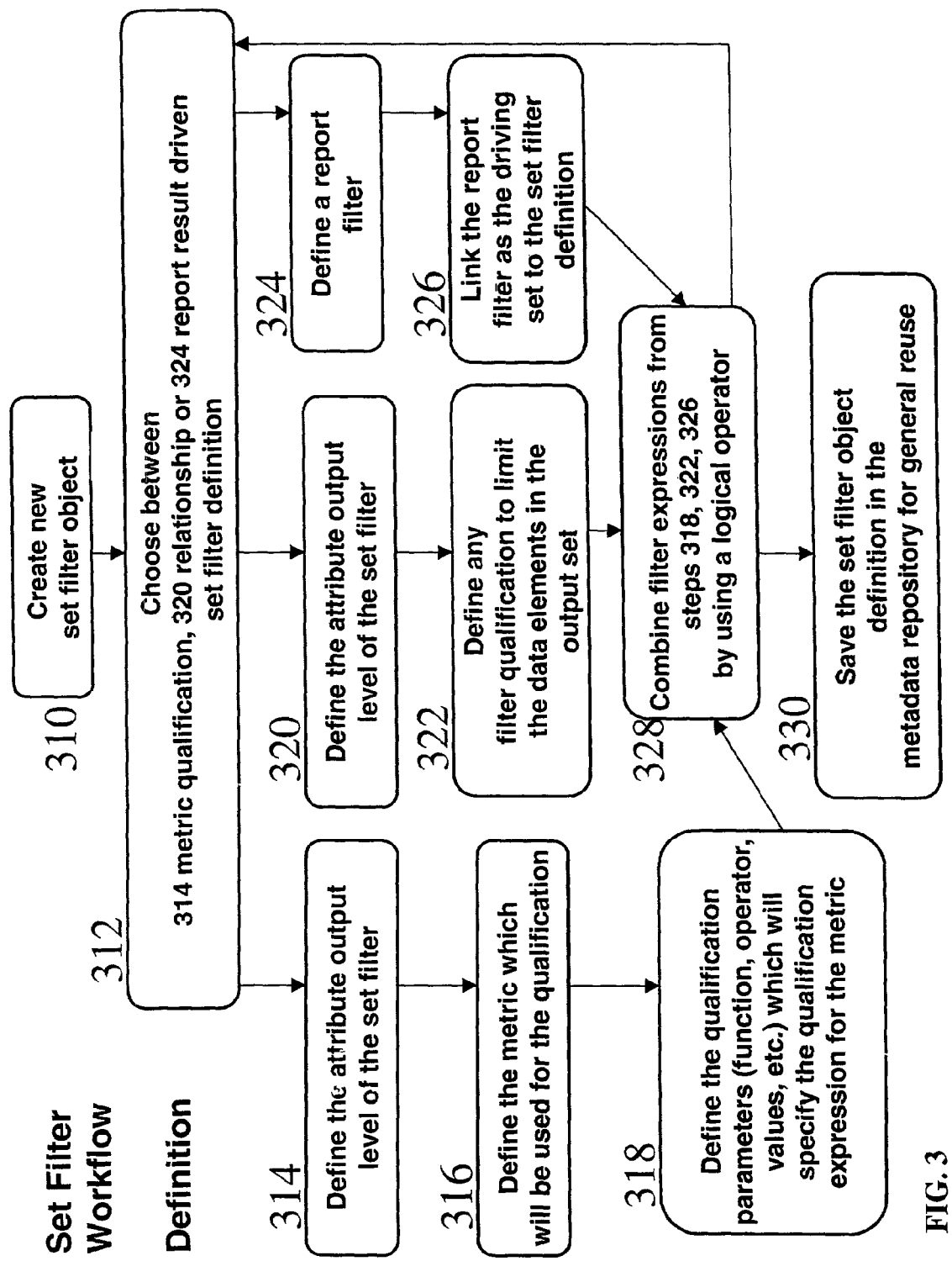
FIG. 3 is a flowchart illustrating steps performed by a process of an embodiment of the invention in which a set filter object definition is created.
Figure 4:
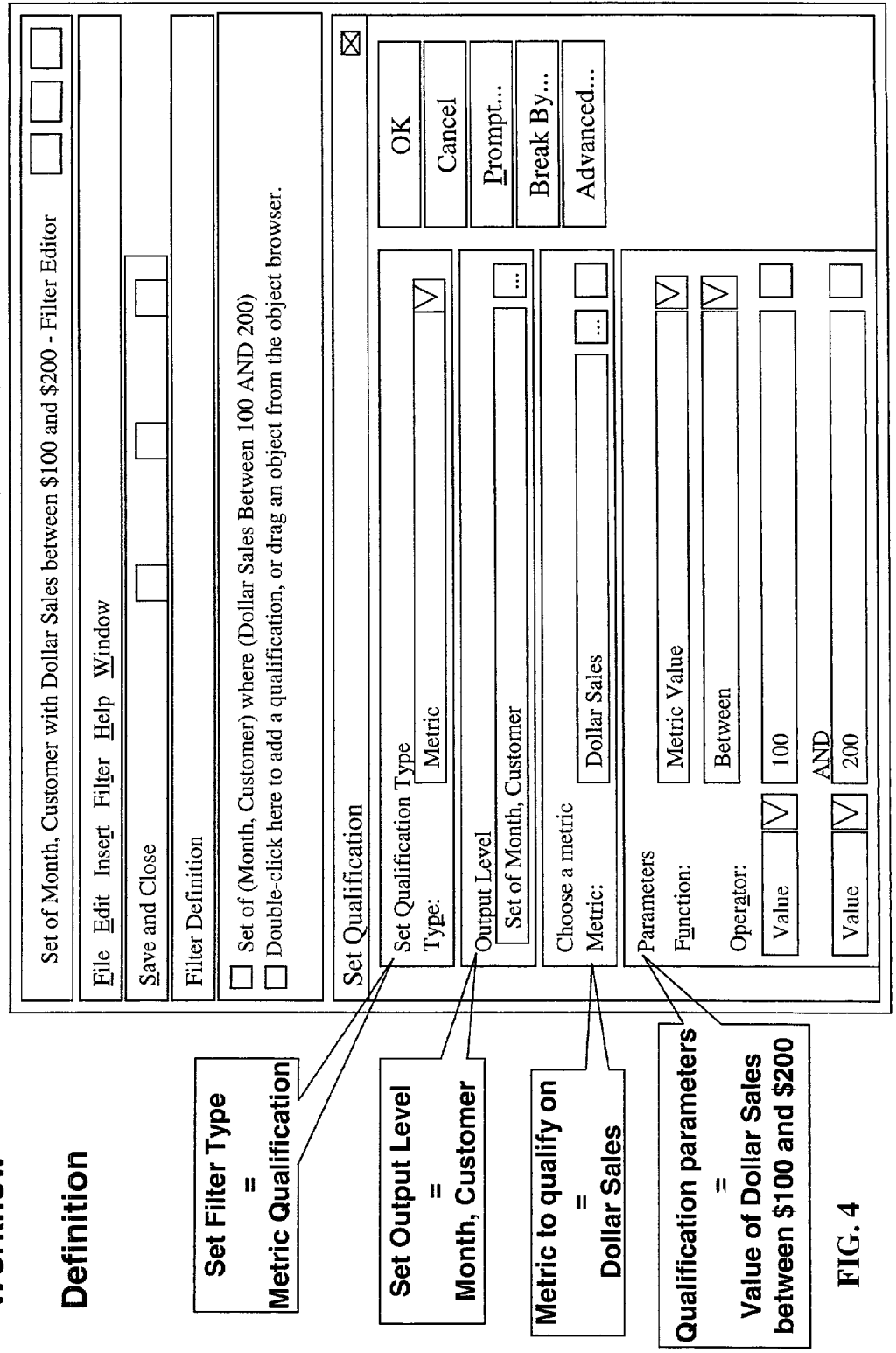
FIG. 4 illustrates an example of an interface display of a set filter object definition.

FIG. 3 is a general flowchart illustrating steps performed by a process of an embodiment of the invention in which a set filter object definition is created. In step 310, the process of creating a new set filter object begins. In step 312, a choice is made between a metric qualification, a relationship, or a report result driven set filter definition. If a metric qualification is chosen in step 312, processing proceeds to step 314 where the attribute output level of the set filter is defined. In the example shown in FIG. 4, the output level chosen in step 314 of FIG. 3 is "Month, Customer". In step 316, the metric which will be used for the qualification of the output of the set filter is defined. In the example shown in FIG. 4, the metric chosen as the qualification is "Dollar Sales". In step 318, the qualification parameters which will specify the qualification expression for the metric are defined. In the example of FIG. 4, the qualification parameters are chosen as limiting the metric value "Dollar Sales" to values between $100 and $200.

Figure 5:
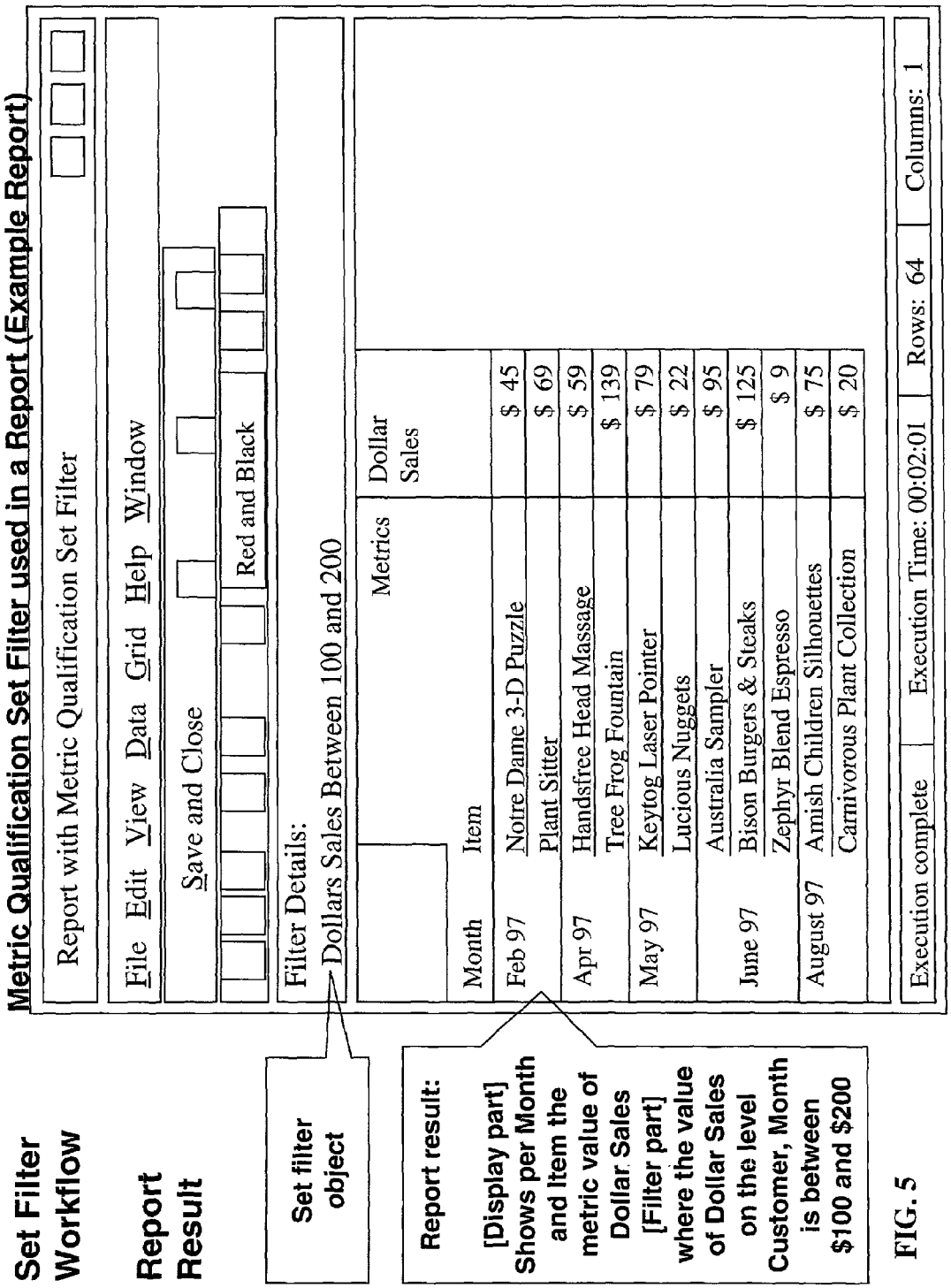
FIG. 5 illustrates an example of an interface display of a report using a set filter.

FIG. 5 shows an example of a report generated by the metric qualifications set filter shown in FIG. 4. The report of FIG. 5 shows per Month and Item the Dollar Sales where the value of the Dollar Sales on the Customer, Month level is between $100 and $200.

FIGS. 6 and 7 show the processing statements, in this example SQL statements, of the first and second processing passes, respectively. In FIG. 6, the SQL statements of the first SQL pass produce all Customer, Month combinations with a total of Dollar Sales between $100 and $200. These results are stored in a temporary table on which the SQL statements of the second SQL pass (FIG. 7) are run. The SQL statements of the second SQL pass shown in FIG. 7 calculate for each Month and Item the total Dollar Sales value for all Customers and Months which are contained in the temporary table generated by the first SQL pass of FIG. 6.

Figure 8:
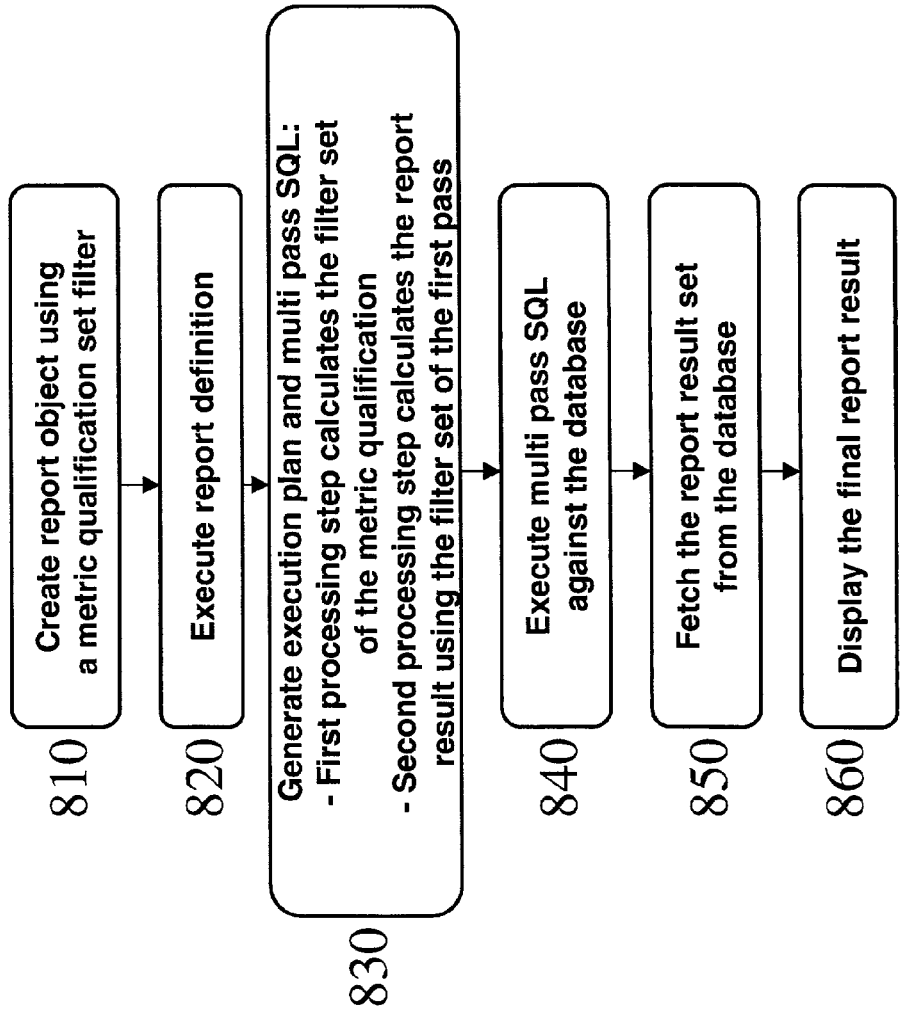
FIG. 8 is a flowchart illustrating steps performed by a process of an embodiment of the invention in which a report using a metric qualification set filter is generated.

FIG. 8 is a flowchart illustrating steps performed in the above described process. In step 810, the process of creating a report object using a metric qualification set filter begins. In step 820, a report definition is executed to generate, in step 830, an execution plan having multi-pass processing such as, for example, a multi-pass SQL. A first processing step of the SQL calculates the filter set of the metric qualification and a second processing step of the SQL calculates the report result using the filter set of the first pass. Although this example shows only two passes in the multi-pass SQL, it is noted that the execution plan can contain more than two passes. In step 840, the multi-pass SQL is executed against the database. In step 850, a report result set is fetched from the database and, in step 860, the final report result is displayed.

Figure 9:
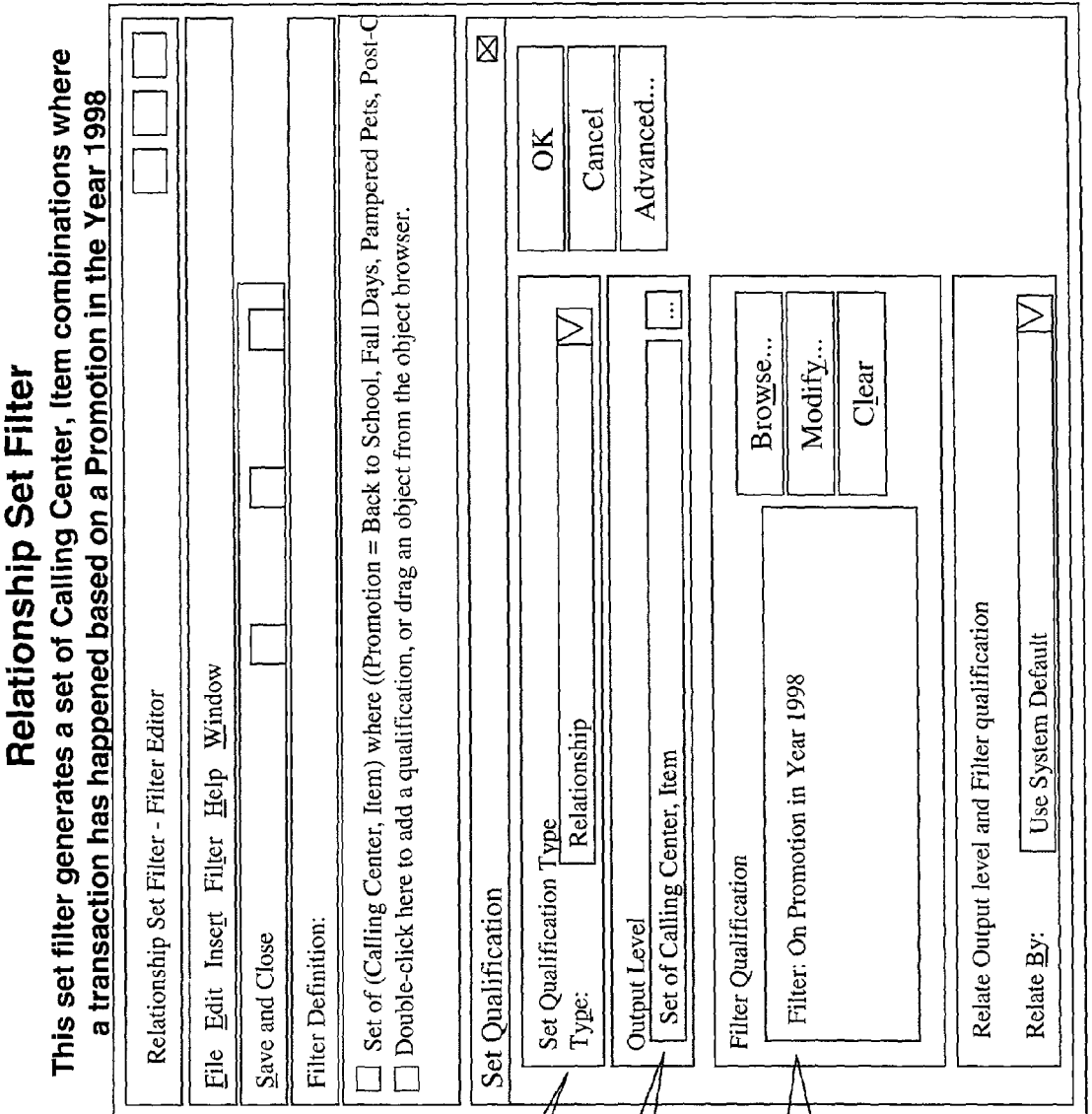
FIG. 9 illustrates an example of an interface display of a relationship set filter definition.
Figure 10:
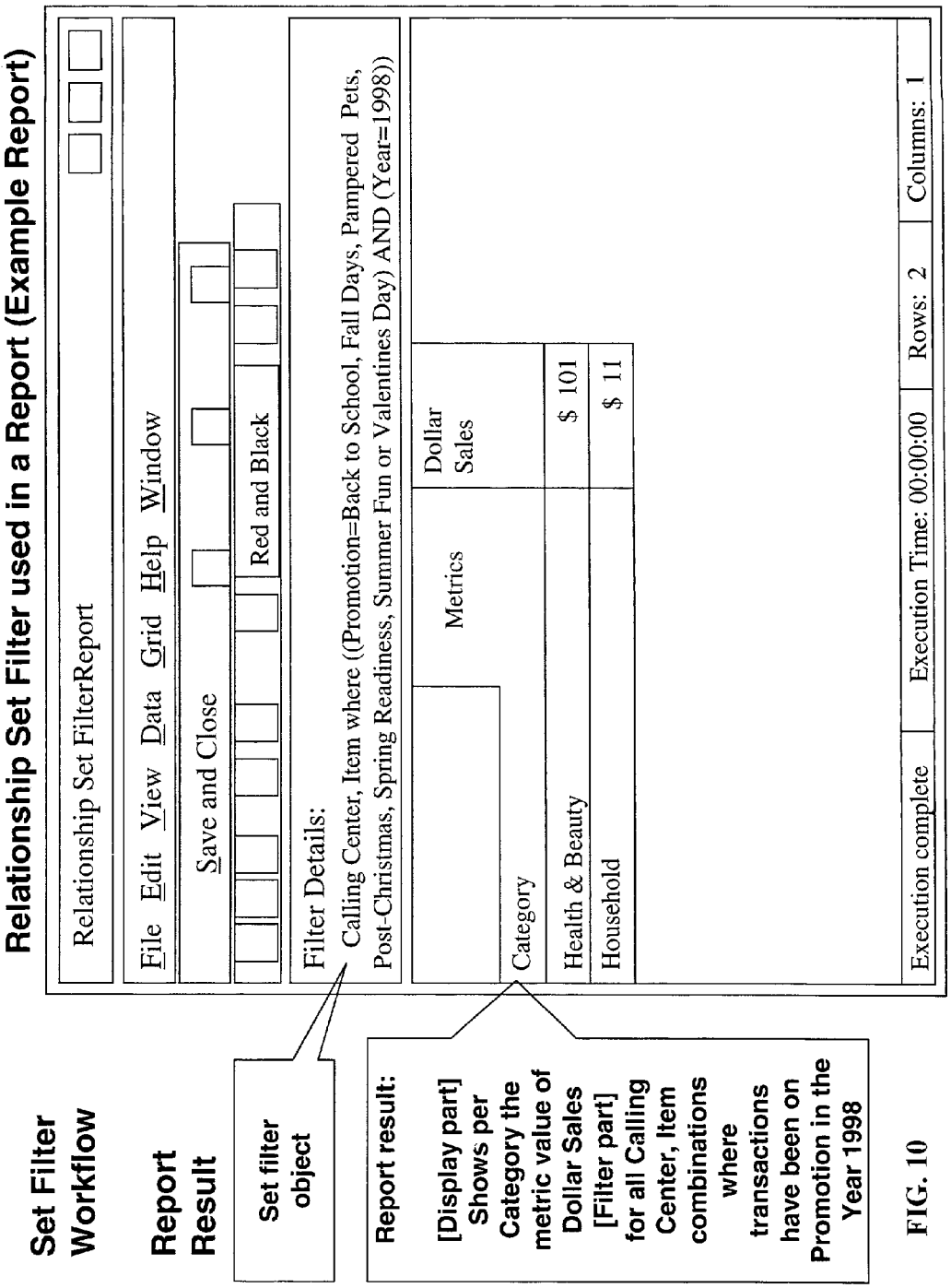
FIG. 10 illustrates an example of an interface display of a report using a relationship set filter.

Returning to FIG. 3, if a relationship set filter definition is chosen in step 312, processing proceeds to step 320, wherein the attribute output level of the set filter is defined. In the example shown in FIG. 9, the set output level is defined as "Calling Center, Item". In step 322, a filter qualification is defined to limit the data elements in the output set. In the example shown in FIG. 9, the filter qualification is defined as "On Promotion in Year 1998". An example of a report resulting from the set filter definition shown in FIG. 9 is shown in FIG. 10. The report in FIG. 10 shows per category (Calling Center, Item) the Dollar Sales for all Calling Center, Item combinations where transactions have been on promotion in the year 1998.

FIGS. 11 and 12 show processing statements, in this example SQL statements, of first and second SQL passes that produce a report such as that shown in FIG. 10. In the first SQL pass shown in FIG. 11, all Calling Center, Item combinations with a Dollar Sales transaction for Promotions in the Year 1998 are stored in a temporary table. The second SQL pass shown in FIG. 12 is run on the results of the first SQL pass of FIG. 11 and calculates for each category (Calling Center, Item) the value of Dollar Sales.

Figure 13:
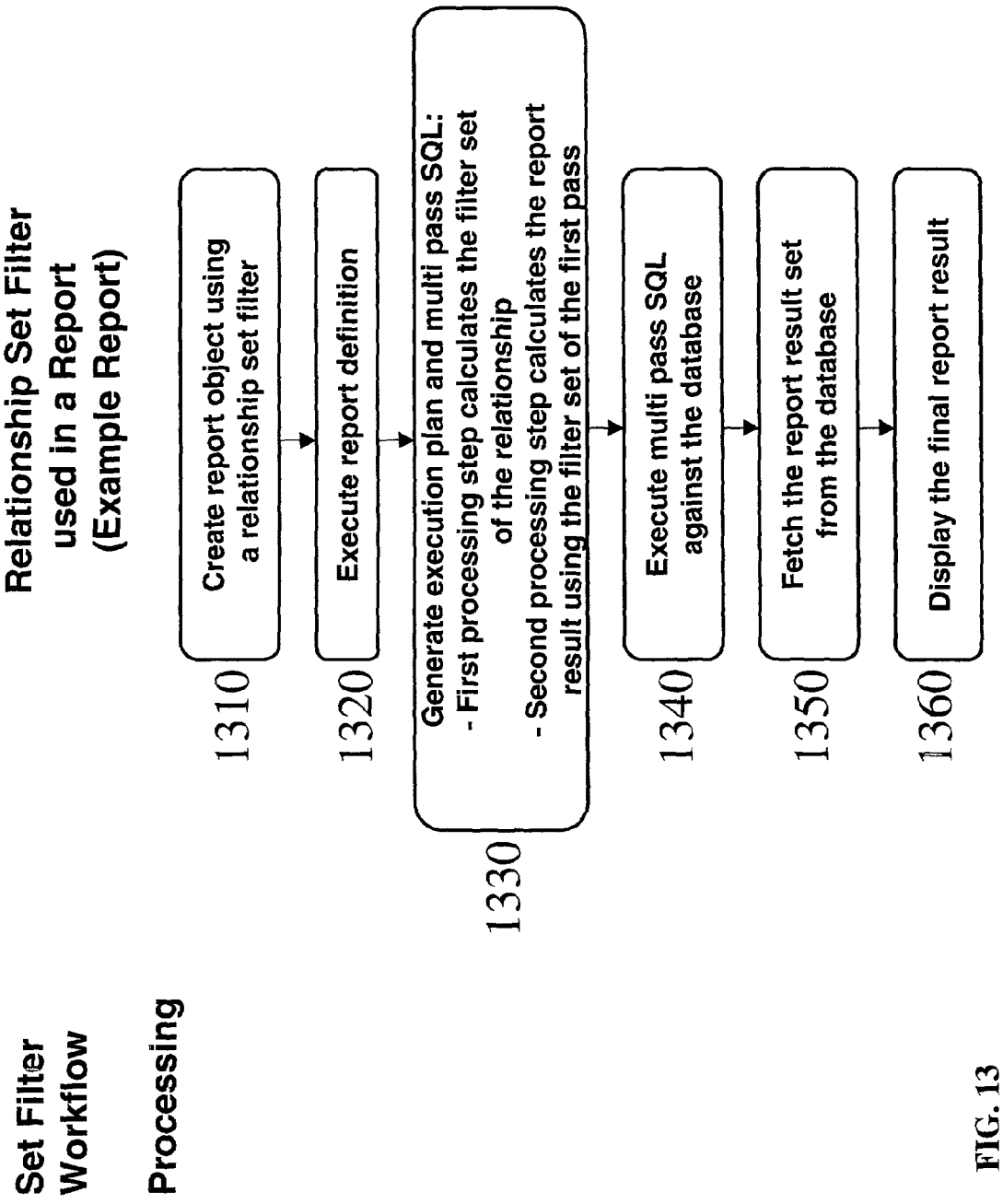
FIG. 13 is a flowchart illustrating steps performed by a process of an embodiment of the invention in which a report definition is used as a set filter.

FIG. 13 is a flow chart illustrating steps performed by a process that produces a report such as that shown in FIG. 10. In step 1310, the creation of a report object using a relationship set filter begins. In step 1320, the report definition is executed to generate, in step 1330, an execution plan having multi-pass processing such as, for example, a multi-pass SQL. A first processing step of the SQL calculates the filter set of the relationship and a second processing step of the SQL calculates the report result using the filter set of the first pass. Although this example shows an execution plan having a two-pass SQL, the SQL can contain more that two passes. In step 1340, the multi-pass SQL is executed against the database. In step 1350, the report result set is fetched from the database and, in step 1360, the final report result is displayed.

Figure 14:
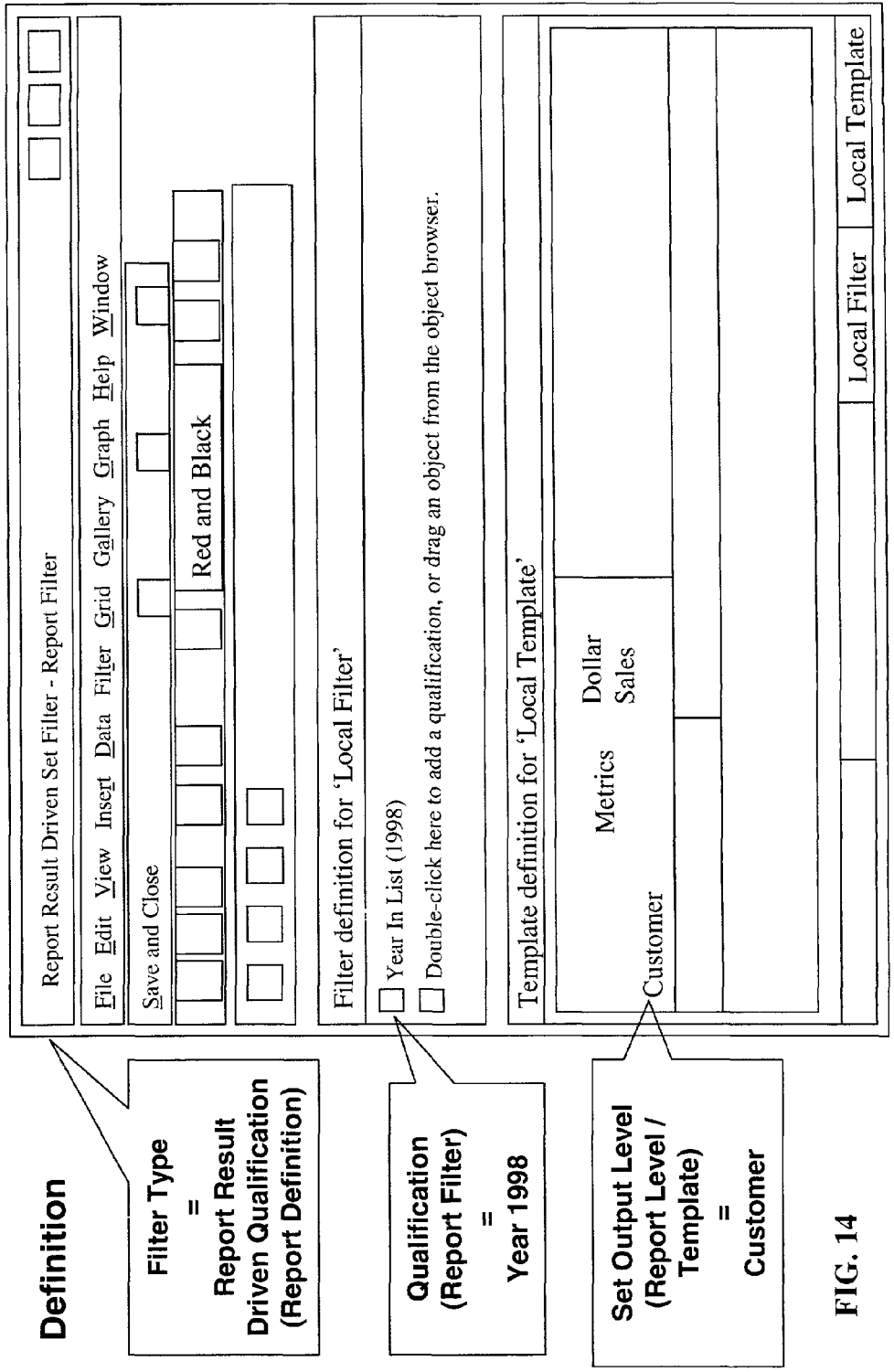
FIG. 14 illustrates an example of an interface display of a report result driven set filter.

Returning to FIG. 3, if a report result driven set filter definition is chosen in step 312, processing proceeds to step 324 where a report filter is defined. FIG. 14 shows a simple example of a report definition in which the report filter is set as "Year 1998". In step 326, the report definition is linked as the driving set to the set filter definition. In the example shown in FIG. 14, the set filter definition (set output level) is defined as "Customer". FIG. 15 shows an example of a report produced by the report result driven set filter definition shown in FIG. 14. The report shown in FIG. 15 displays per category The Dollar Sales for all Customers with Dollar Sales in Year 1998.

FIGS. 16 and 17 show processing statements, in this example SQL statements, for first and second SQL passes, respectively, used to produce a report such as that shown in FIG. 15. In FIG. 16, the SQL statement produces a table including all Customers with a Dollar Sales transaction for the Year 1998. The SQL statement of FIG. 17 calculates for each category the Dollar Sales for all Customers contained in the table produced by the SQL statement of FIG. 16.

Figure 18:
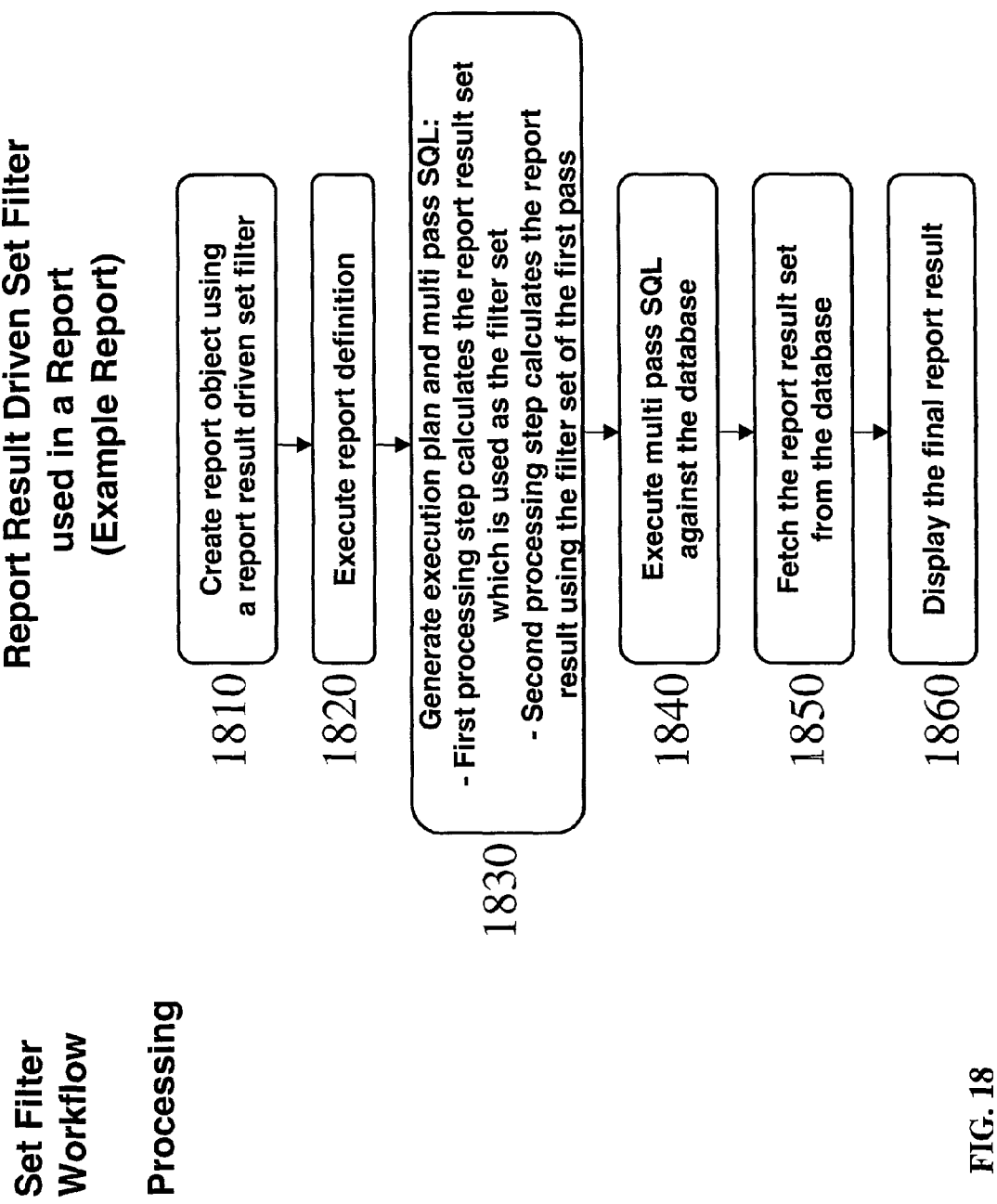
FIG. 18 is a flowchart illustrating steps performed by a process of an embodiment of the invention in which a report using report result driven set filtering is generated.

FIG. 18 is a flowchart illustrating steps performed by a process that produces a report such as that shown in FIG. 15. In step 1810, the creation of a report object using a report result driven set filter begins. In step 1820, a report definition is executed to generate, in step 1830, an execution plan having multi-pass processing such as, for example, a multi-pass SQL. The first processing step of the SQL calculates a report result set which is used as the filter set, and a second processing step of the SQL calculates the report result using the filter set. Although a multi-pass SQL having two processing steps is shown in this example, it is noted that a multi-pass SQL having more than two processing steps can be used. In step 1840, the multi-pass SQL is executed against the database. In step 1850, the report result set is fetched from the database and, in step 1860, the final report is displayed.

Figure 19:
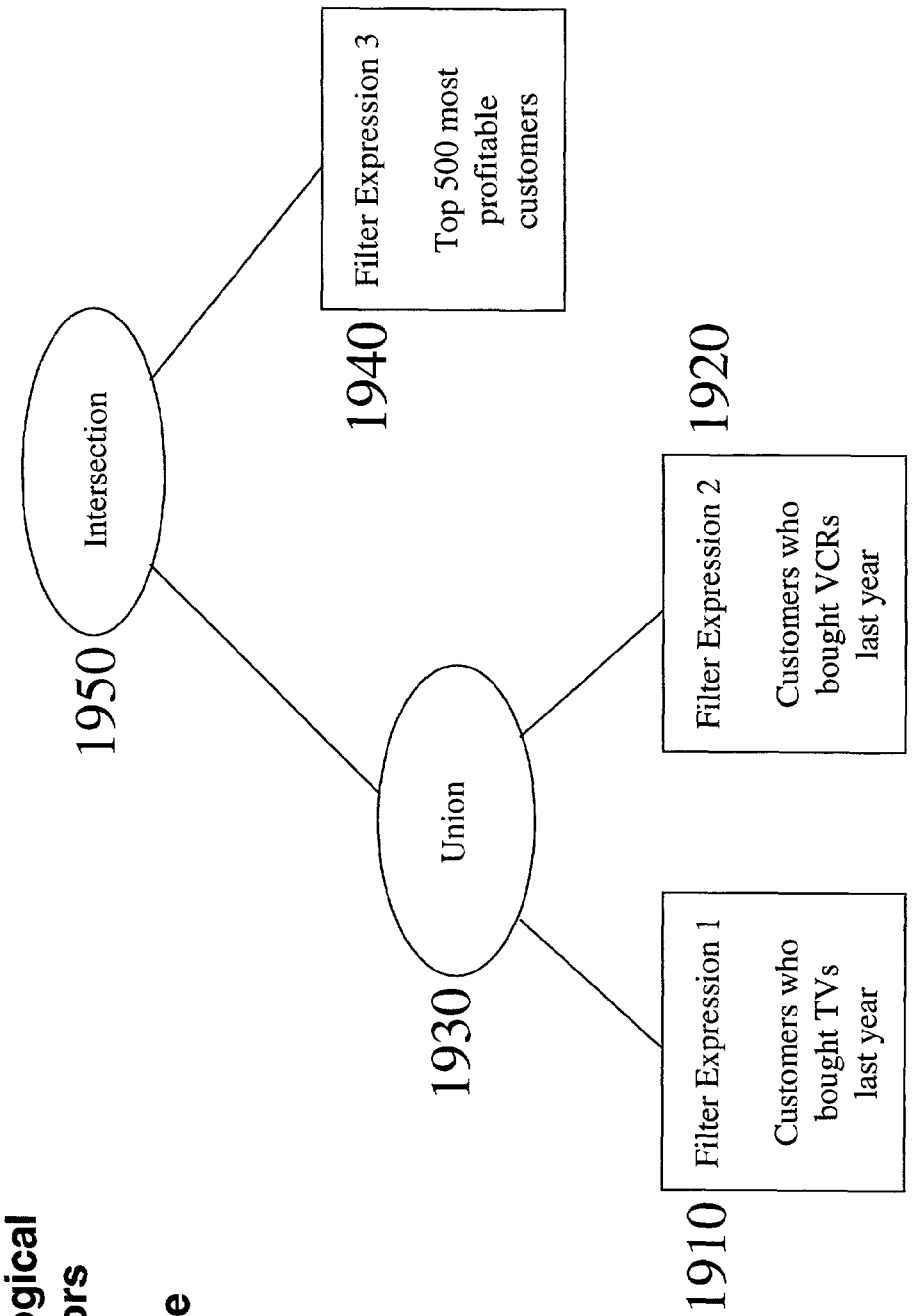
FIG. 19 is an expression tree showing the use of logical operators in particular embodiments of the invention.

Returning to FIG. 3, in step 328, any filter expressions created in steps 318, 322 and 326 can be combined with each other using logical operators. FIG. 19 (discussed below) shows an example of three filter expression sets being combined using logical operators.

In step 330, the set filter object definition can be saved, for example, in a metadata repository for general reuse.

In FIG. 19, an expression filter set Customers Who Bought TVs Last Year 1910 is combined by a logical union 1930 with an expression filter set Customers Who Bought VCRs Last Year 1920. The result of logical union 1930 would be the set of customers who bought either a TV or a VCR last year. The result of logical union 1930 is combined by a logical intersection 1950 with an expression filter set Top 500 Most Profitable Customers 1940. The result of logical intersection 1950 would be the set of top 500 most profitable customers who bought either a TV or a VCR last year. FIG. 19 illustrates just one example of the limitless combinations of expression filter sets possible using logical operators. In addition, the logical operators that can be used are not limited union and intersection, but can be any logical operator.

For further clarification, a filter predicate may be though of as a logical statement such as [expression] [operator] [expression] where the expressions can be attributes, variables, lists, etc. and the operators may be valid mathematical or logical operators. Examples may include 1=1, Store=1, and Store is Null is also valid. Each of these logical statements may be thought of as qualifications with a number of qualifying predicates and, if multiple predicates are present, one or more operators, such as (1=1) OR (Store=1).

While the foregoing description includes many details and specificities, it is to be understood that these have been included for purposes of explanation only, and are not to be interpreted as limitations of the present invention. Modifications to the embodiments described above can be made without departing from the spirit and scope of the invention.

The invention claimed is:

1. A non-transitory computer processor readable storage medium storing executable instructions to generate a report, the non-transitory computer processor readable storage medium comprising:

a relationship set filter object stored on the non-transitory computer processor readable storage medium, wherein the filter object comprises at least one qualifying predicate;

an output level;

at least one relationship used by a computer processor to generate the report by automatically instantiating the relationship set filter object to automatically determine how to apply the relationship set filter object to input data to generate a result at a level defined by the output level, the report including the input data and the relationship set filter object;

wherein the relationship used by the computer processor to automatically determine specifies multiple actions selected from a group of multiple passes against the plurality of databases or against intermediate results determined by a prior pass against the plurality of databases;

a query engine configured to:

determine whether a query is processable by one or more of the plurality of databases;

transmit the query directly to one or more of the plurality of databases if the query is processable by one or more of the plurality of databases;

translate the query to a syntax compatible with one or more of the plurality of databases if the query is not processable by one or more of the plurality of databases;

verify at least one pass against the plurality of databases, the verification including:

parsing the query associated with the at least one pass to identify invalid formatting, the invalid formatting including invalid database query formatting;

trapping identified invalid formatting if the invalid formatting is identified, wherein the generating the report is based on the verifying at least one pass against a plurality of databases; and a transmission facility configured to transmit the report to one or more types of user devices, wherein a user receives the transmitted report if a user specified condition has been satisfied.

2. The medium of claim 1, wherein the at least one relationship comprises a table.

3. The medium of claim 1 wherein the at least one relationship comprises an expression.

4. The medium of claim 1 wherein the at least one relationship comprises a metric.

5. The medium of claim 1 wherein the at least one relationship comprises an attribute.

6. The medium of claim 1 wherein the output level comprises one or more attributes.

7. The medium of claim 1 wherein the filter object comprises a plurality of qualifying predicates and at least one logical operators.

8. The medium of claim 1 wherein the at least one relationship is required to resolve ambiguity on how to instantiate the relationship set filter object.

9. A method of generating a report from a plurality of databases, the report being based on input data from a database and at least one relationship set filter object, the method comprising the steps of:
- defining the at least one relationship set filter object to including a filter object, an output level, and at least one relationship, wherein the relationship set filter object comprises at least one qualifying predicate;
- defining the report to include at least the input data and the at least one relationship set filter object;
- generating the report by automatically instantiating, using a computer processor, the relationship set filter object against the input data to determine how to apply the relationship set filter object to the input data to generate contents of the output level, the act of determining resulting in multiple actions selected from a group of multiple passes against the plurality of databases or against intermediate results determined by a prior pass against the plurality of databases;
- determining whether a query is processable by one or more of the plurality of databases;
- transmitting the query directly to one or more of the plurality of databases if the query is processable by one or more of the plurality of databases;
- translating the query to a syntax compatible with one or more of the plurality of databases if the query is not processable by one or more of the plurality of databases;
- verifying, using a query engine, at least one pass against the plurality of databases, the verification including:
  - parsing the query associated with the at least one pass to identify invalid formatting, the invalid formatting including invalid database query formatting;
  - trapping identified invalid formatting if the invalid formatting is identified, wherein the generating the report is based on the verifying at least one pass against a plurality of databases; and
- transmitting the report via a transmission facility to one or more types of user devices, wherein a user receives the transmitted report if a user specified condition has been satisfied.

10. The method of claim 9 wherein the at least one relationship comprises a table.

11. The method of claim 9 wherein the at least one relationship comprises an expression.

12. The method of claim 9 wherein the at least one relationship comprises a metric.

13. The method of claim 9 wherein the at least one relationship comprises an attribute.

14. The method of claim 9 wherein the output level comprises at least one attribute.

15. The method of claim 9 wherein the relationship set filter object comprises a plurality of qualifying predicates and at least one logical operators.

16. The method of claim 9 wherein the at least one relationship is required to resolve ambiguity on how to instantiate the relationship set filter object.

17. A non-transitory recording medium storing processor readable program instructions for causing a processor to generate a report, the instructions enabling a user of the program to perform:
- defining at least one relationship set filter object to including a filter object, an output level, and at least one relationship, wherein the relationship set filter object comprises at least one qualifying predicate;
- defining the report to include at least input data and the at least one relationship set filter object;
- determining whether a query is processable by one or more of the plurality of databases;
- transmitting the query directly to one or more of the plurality of databases if the query is processable by one or more of the plurality of databases; and
- translating the query to a syntax compatible with one or more of the plurality of databases if the query is not processable by one or more of the plurality of databases;
- generating the report by automatically instantiating the relationship set filter object against the input data to determine how to apply the filter object to the input data to generate contents of the output level, the act of determining resulting in multiple actions selected from the group of multiple passes against a plurality of databases or against the intermediate results determined by a prior pass against the plurality of databases;
- verifying, using a query engine, at least one pass against the plurality of databases, the verification including:
  - parsing the transmitted query associated with the at least one pass to identify invalid formatting, the invalid formatting including invalid database query formatting;
  - trapping identified invalid formatting if invalid formatting is identified, wherein the generating the report is based on the verifying at least one pass against a plurality of databases;

and
- transmitting the report via a transmission facility to one or more types of user devices, wherein a user receives the transmitted report if a user specified condition has been satisfied.

18. The medium of claim 17 wherein the at least one relationship comprises a table.

19. The medium of claim 17 wherein the at least one relationship comprises an expression.

20. The medium of claim 17 wherein the at least one relationship comprises a metric.

21. The medium of claim 17 wherein the at least one relationship comprises an attribute.

22. The medium of claim 17 wherein the output level comprises at least one attribute.

23. The medium of claim 17 wherein the filter object comprises a plurality of qualifying predicates and at least one logical operators.

24. The medium of claim 17 wherein the relationship is required to resolve ambiguity on how to instantiate the relationship set filter object.

* * * * *